(12) United States Patent
Blair et al.

(10) Patent No.: US 10,439,431 B2
(45) Date of Patent: Oct. 8, 2019

(54) METHOD TO REDUCE INRUSH CURRENTS IN A TRANSFORMER-LESS RECTIFIER UNINTERRUPTIBLE POWER SUPPLY SYSTEM

(71) Applicant: Liebert Corporation, Columbus, OH (US)

(72) Inventors: Charles F. Blair, Powell, OH (US); Terry D. Bush, Westerville, OH (US); Xian Chen, Columbus, OH (US)

(73) Assignee: Vertiv Corporation, Columbus, OH (US)

( * ) Notice: Subject to any disclaimer, the term of this patent is extended or adjusted under 35 U.S.C. 154(b) by 55 days.

(21) Appl. No.: 15/412,476

(22) Filed: Jan. 23, 2017

(65) Prior Publication Data

US 2017/0244277 A1 Aug. 24, 2017

Related U.S. Application Data

(60) Provisional application No. 62/298,490, filed on Feb. 23, 2016.

(51) Int. Cl.
*H02J 9/06* (2006.01)
*H02M 1/32* (2007.01)
(Continued)

(52) U.S. Cl.
CPC ............ *H02J 9/062* (2013.01); *H02H 7/125* (2013.01); *H02H 9/001* (2013.01); *H02M 1/32* (2013.01); *H02M 1/36* (2013.01); *H02M 5/4585* (2013.01)

(58) Field of Classification Search
CPC ......... H02H 7/125; H02H 9/001; H02J 9/062; H02M 1/32; H02M 1/36; H02M 5/4585
See application file for complete search history.

(56) References Cited

U.S. PATENT DOCUMENTS

| 4,471,233 A | 9/1984 | Roberts |
| 4,503,938 A | 3/1985 | Nomura |

(Continued)

FOREIGN PATENT DOCUMENTS

| CN | 1934774 A | 3/2007 |
| CN | 201541135 U | 8/2010 |

(Continued)

OTHER PUBLICATIONS

International Search Report and Written Opinion regarding PCT/US2017/018837, dated Jun. 13, 2017.

(Continued)

*Primary Examiner* — Rexford N Barnie
*Assistant Examiner* — Elim Ortiz
(74) *Attorney, Agent, or Firm* — Harness, Dickey & Pierce, P.L.C.

(57) ABSTRACT

A method reduces inrush currents in a transformer-less rectifier UPS system when an input circuit breaker of the UPS system is closed from an open position. The circuit breaker is coupled between an AC power input and an AC input of a rectifier of the UPS system and a DC output of the rectifier is coupled to a DC bus of the UPS system. Before the circuit breaker is closed, the DC bus is charged to a DC voltage having a level that is equal to a peak AC voltage level of a line-line AC voltage of AC input power to the UPS system. The rectifier is operated as an inverter to provide an AC output voltage at the AC input of the rectifier that is equal to an AC voltage at the AC power input and when it is equal, the circuit breaker is closed.

3 Claims, 3 Drawing Sheets

(51) Int. Cl.
*H02M 1/36* (2007.01)
*H02H 7/125* (2006.01)
*H02H 9/00* (2006.01)
*H02M 5/458* (2006.01)

(56) References Cited

U.S. PATENT DOCUMENTS

| | | | |
|---|---|---|---|
| 4,508,974 A | 4/1985 | Henderson | |
| 4,763,013 A * | 8/1988 | Gvoth, Jr. | H02J 9/062 307/46 |
| 4,864,482 A | 9/1989 | Quazi et al. | |
| 5,574,632 A | 11/1996 | Pansier | |
| 5,619,127 A | 4/1997 | Warizaya | |
| 5,894,396 A | 4/1999 | Kim | |
| 5,960,130 A | 9/1999 | Pimpinella | |
| 5,990,581 A | 11/1999 | Ikegami et al. | |
| 6,055,163 A * | 4/2000 | Wagner | H02J 3/38 323/241 |
| 6,445,165 B1 | 9/2002 | Malik et al. | |
| 6,654,262 B2 | 11/2003 | Hussein et al. | |
| 6,917,124 B2 | 7/2005 | Shetler, Jr. et al. | |
| 7,092,262 B2 | 8/2006 | Ryan et al. | |
| 7,684,222 B2 | 3/2010 | Paatero | |
| 7,929,323 B2 | 4/2011 | Schmidt | |
| 8,053,927 B2 | 11/2011 | Hjort et al. | |
| 8,299,762 B2 | 10/2012 | Rozman et al. | |
| 8,305,783 B2 | 11/2012 | Rizzo | |
| 8,427,116 B2 | 4/2013 | Rozman et al. | |
| 8,503,199 B1 | 8/2013 | Chapuis et al. | |
| 8,816,631 B2 | 8/2014 | Wei et al. | |
| 8,885,308 B2 | 11/2014 | Waltman et al. | |
| 9,065,266 B2 | 6/2015 | Divan | |
| 9,083,200 B2 | 7/2015 | Tsai et al. | |
| 9,385,523 B2 | 7/2016 | Freitag et al. | |
| 9,520,874 B2 | 12/2016 | Bush et al. | |
| 2002/0122321 A1 | 9/2002 | Chapuis et al. | |
| 2005/0088868 A1 | 4/2005 | Ryan et al. | |
| 2005/0213357 A1 | 9/2005 | Paatero | |
| 2007/0252565 A1 | 11/2007 | Wang et al. | |
| 2008/0265680 A1 | 10/2008 | Marwali et al. | |
| 2012/0262140 A1 | 10/2012 | Divan | |
| 2014/0001862 A1 | 1/2014 | Hsueh et al. | |
| 2014/0139022 A1 | 5/2014 | Bush et al. | |
| 2015/0288222 A1 | 10/2015 | Bergman | |
| 2016/0223620 A1 | 8/2016 | Heber | |
| 2016/0301298 A1 | 10/2016 | Gonthier et al. | |
| 2017/0085125 A1 * | 3/2017 | Ghosh | H02M 7/487 |
| 2017/0149366 A1 | 5/2017 | Gibbs et al. | |

FOREIGN PATENT DOCUMENTS

| | | |
|---|---|---|
| CN | 102449876 A | 5/2012 |
| CN | 104104219 A | 10/2014 |
| CN | 104638624 A | 5/2015 |
| CN | 205921399 U | 2/2017 |
| DE | 9216662 U1 | 1/1993 |
| EP | 1755209 A1 | 2/2007 |
| KR | 20160083270 A | 7/2016 |
| SU | 1270829 A1 | 11/1986 |
| WO | WO-2006093647 A1 | 9/2006 |
| WO | WO-2015185630 A1 | 12/2015 |

OTHER PUBLICATIONS

First Chinese Office Action regarding CNSN 2017800125600, dated Jun. 5, 2019.

* cited by examiner

METHOD TO REDUCE INRUSH CURRENTS IN A TRANSFORMER-LESS RECTIFIER UNINTERRUPTIBLE POWER SUPPLY SYSTEM

CROSS-REFERENCE TO RELATED APPLICATION

This application claims the benefit of U.S. Provisional Application No. 62/298,490 filed Feb. 23, 2016. The entire disclosure of the above application is incorporated herein by reference.

FIELD

The present disclosure relates to reducing inrush currents during startup of a UPS system having a transformer-less rectifier.

BACKGROUND

This section provides background information related to the present disclosure which is not necessarily prior art.

One common type of uninterruptible power supply (UPS) system is a double conversion UPS system that has a rectifier that converts AC input power to DC power that is provided via a DC bus to an inverter that converts the DC power back to AC power. A circuit breaker is coupled between an AC power input and an input of the rectifier. The AC power input is coupled to a source of AC power, such as a power feed from a utility. An LC input circuit is coupled between an AC input of the rectifier and the circuit breaker and a fuse is typically coupled between the circuit breaker and the LC circuit. In this regard, if the UPS system is a three-phase system, the rectifier has three AC inputs and the circuit breaker has three poles and a respective LC input circuit is coupled between each pole of the circuit breaker and a respective one of the AC inputs of the rectifier. One type of double conversion UPS system does not have an input transformer coupled between the AC input of the rectifier and the AC power input and is referred to herein as a transformer-less rectifier UPS system. It should be understood that such transformer-less rectifier UPS system can have a transformer coupled between an output of the inverter and an output of the UPS system or not have a transformer coupled between the output of the inverter and the output of the UPS system.

In transformer-less rectifier UPS systems, when the circuit breaker is closed, large inrush currents flow from the source of the AC power to the capacitors of the LC input circuits. This typically requires additional considerations and design costs for the circuit/fuse design to address the effects of these large inrush currents.

SUMMARY

This section provides a general summary of the disclosure, and is not a comprehensive disclosure of its full scope or all of its features.

In accordance with an aspect of the present disclosure, a method reduces inrush currents in a transformer-less rectifier UPS system when an input circuit breaker of the UPS system is transitioned from an open to a closed position. In the UPS system, the circuit breaker is coupled between an AC power input and an AC input of a rectifier of the UPS system, a DC output of the rectifier is coupled to a DC bus of the UPS system and an input of an inverter is coupled to the DC bus. The method of reducing inrush currents includes before the circuit breaker is transitioned to the closed position from the open position, charging the DC bus to a DC voltage level that is equal to a peak AC voltage level of line-line AC voltage of AC input power to the UPS system. The method then operates the rectifier as an inverter to provide an AC output voltage at the AC input of the rectifier, regulates this AC output voltage to be equal to an AC voltage at the AC power input and closes the circuit breaker when the AC voltage at the AC input of the rectifier is equal to the AC voltage at the AC power input.

In an aspect, the method includes operating a pre-charge circuit of the UPS system that is coupled between the DC bus and the AC power input to charge the DC bus to the DC voltage level. In an aspect, operating the pre-charge circuit to charge the DC bus includes closing a controlled switch of the pre-charge circuit to couple a rectifier of the pre-charge circuit to the AC power input and controlling the rectifier of the pre-charge circuit to provide a DC voltage at the DC output of the rectifier that is coupled to the DC bus that has the DC voltage level that is equal to the AC voltage level of the line-line AC voltage of AC input power.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
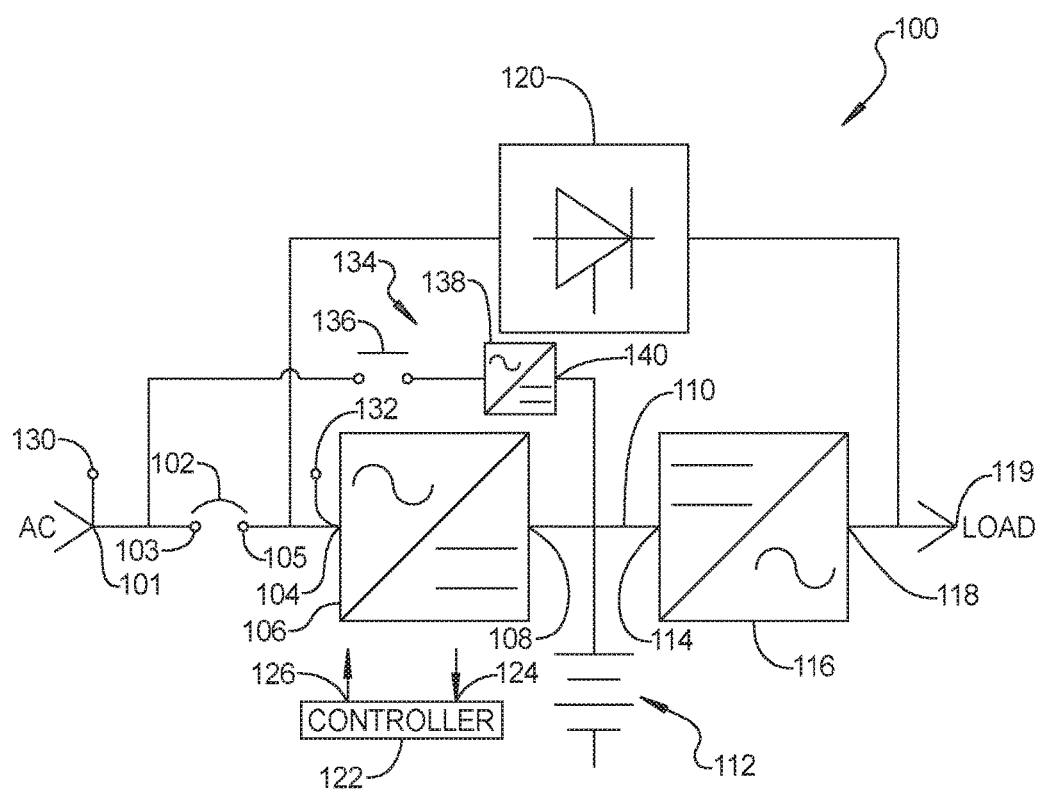
FIG. 1 is a simplified block diagram of a circuit topology of a transformer-less rectifier UPS system in accordance with an aspect of the present disclosure.

FIG. 1 shows a simplified block diagram of a transformer-less rectifier UPS system 100. UPS system 100 includes a circuit breaker 102 coupled between an AC power input 101 (which is coupled to a source of AC power such as a power feed from a utility) and an AC input 104 of a rectifier 106 (which may be referred to herein as a main rectifier). An input side 103 of circuit breaker 102 is coupled to AC power input 101 and an output side 105 of circuit breaker 102 is coupled to AC input 104 of rectifier 106. A DC output 108 of rectifier 106 is coupled to a DC bus 110. DC bus 110 is coupled to a battery 112 and to an input 114 of an inverter 116. An output 118 of inverter 116 provides an output 119 of UPS system 100 to which a load is coupled. A static bypass switch 120 is coupled between AC input 104 of rectifier 106 and output 118 of inverter 116. UPS system 100 also includes a controller 122 that controls the various components of UPS system 100, including rectifier 106, inverter 116, static bypass switch 120 and circuit breaker 102 (which can also be opened and closed manually). Control inputs 124 and control outputs 126 are coupled to these components of UPS system 100 and also to sensors of UPS system 100 including AC voltage sensors 130, 132 which are coupled to AC power input 101 and input 104 of rectifier 106, respectively.

In accordance with an aspect of the present disclosure, UPS system 100 includes DC bus pre-charge circuit 134. Pre-charge circuit 134 includes a controlled switch 136 (a contactor by way of example and not of limitation) and a rectifier 138 that are coupled in series between DC bus 110 and AC power input 101 with DC provided to DC bus 110 from an output 140 of rectifier 138 when pre-charge circuit 134 is operating. Controlled switch 136 and rectifier 138 are controlled by controller 122 and control inputs and outputs of controller 122 are coupled to these components.

Figure 3:
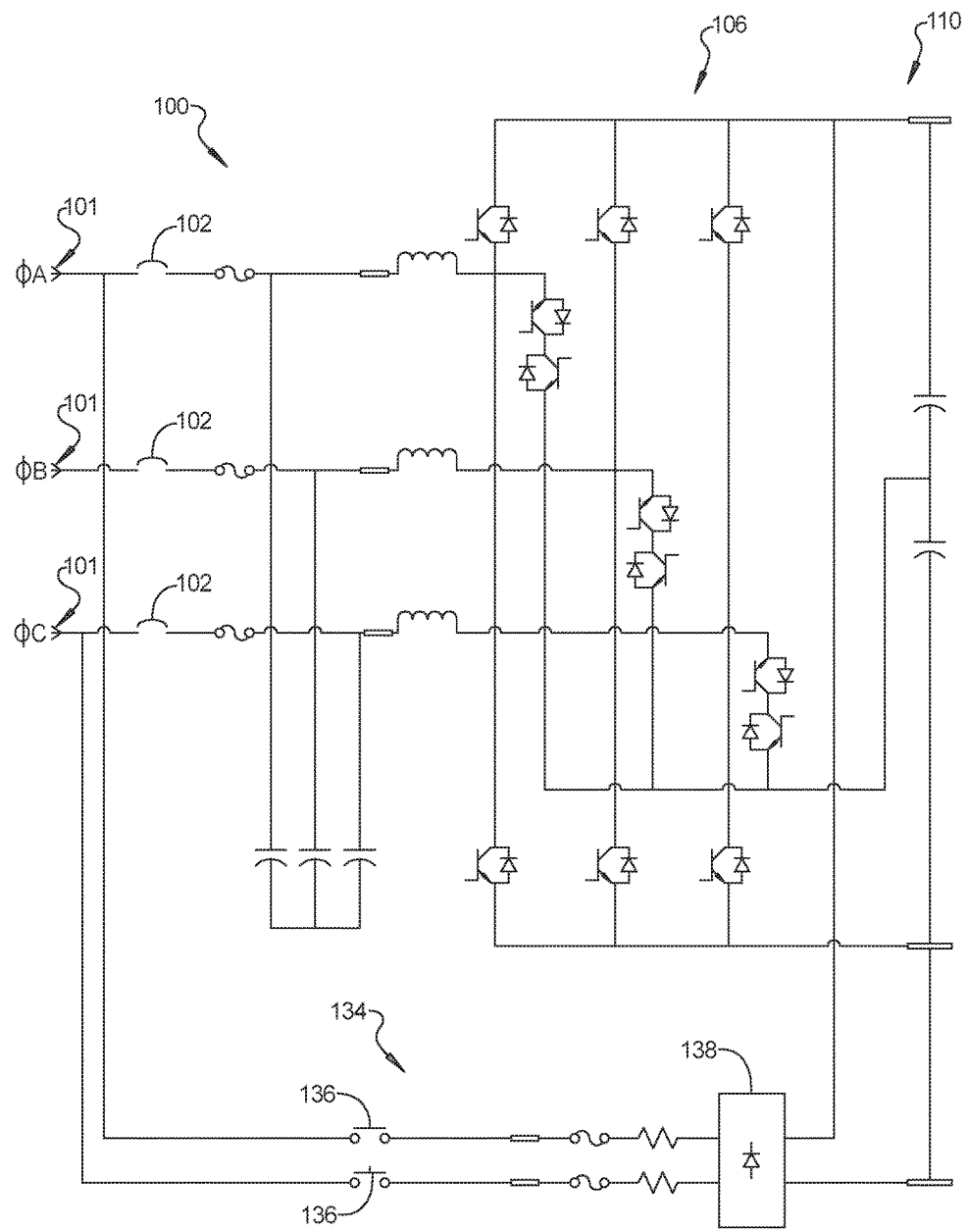
FIG. 3 is a simplified schematic of a circuit topology of a portion of the UPS system of FIG. 1 as a three-phase UPS system.

In operation, during start-up of UPS system 100 before circuit breaker 102 is closed, DC bus 110 is pre-charged to a DC voltage level that is equal to a peak AC voltage level of the line-line AC input voltage. For example, when UPS system 100 is a three-phase UPS system with 3 phase AC input power, the line-line AC input voltage is the AC voltage across two of the three phases. FIG. 3 is a simplified schematic of a circuit topology of an example of UPS system 100 as a three-phase UPS system showing the portion of UPS system 100 that includes AC power input 101, circuit breaker 102, rectifier 106, DC bus 110 and pre-charge circuit 134.

Rectifier 106 is then turned on and operated by controller 122 to run rectifier 106 as an inverter to invert the DC on DC bus 110 to AC at AC input 104 of rectifier 106 which AC is also at output side 105 of circuit breaker 102. The AC voltage at AC input 104 of rectifier 106 is regulated so that it is equal to an AC voltage at AC power input 101 resulting in an AC voltage difference across open circuit breaker 102 being zero. When the AC voltage at AC input 104 of rectifier 106 is equal to the AC voltage at AC power input 101, circuit breaker 102 is closed, illustratively by controller 122. It should be understood that the voltages being equal in this context means that they are equal within typical tolerances, such as +/−3% and the voltage difference across open circuit breaker being zero in this context means being zero within a typical tolerance, such as 3% of a nominal AC line-line voltage. It should also be understood that the voltages being equal in this context means that within the above tolerances, their magnitudes are equal and that they are in sync (that is, the angle difference between the two voltages is zero). It should also be understood that in a three-phase system in which circuit breaker 102 has three poles, one for each phase, the AC voltage measurements are illustratively made line-to-line and the determination is made based on the AC voltage difference across each of the three poles of circuit breaker 102. That is, for the AC voltage difference across circuit breaker 102 to be considered zero, the AC voltage difference across each of the three poles of circuit breaker 102 must be zero (within the above mentioned tolerances).

Reducing the AC voltage difference across circuit breaker 102 to zero before circuit breaker 102 is closed significantly reduces the inrush currents that flow when circuit breaker 102 is closed. Doing so provides the advantages of simplifying the design of fuses and circuits due to inrush currents considerations and helps avoid overdesign cost and effort of resizing electrical components. It also relieves stress on components on the input side of rectifier 106, such as the inductors and capacitors of the LC input circuits and helps prolong the life of related components in rectifier 106.

Figure 2:
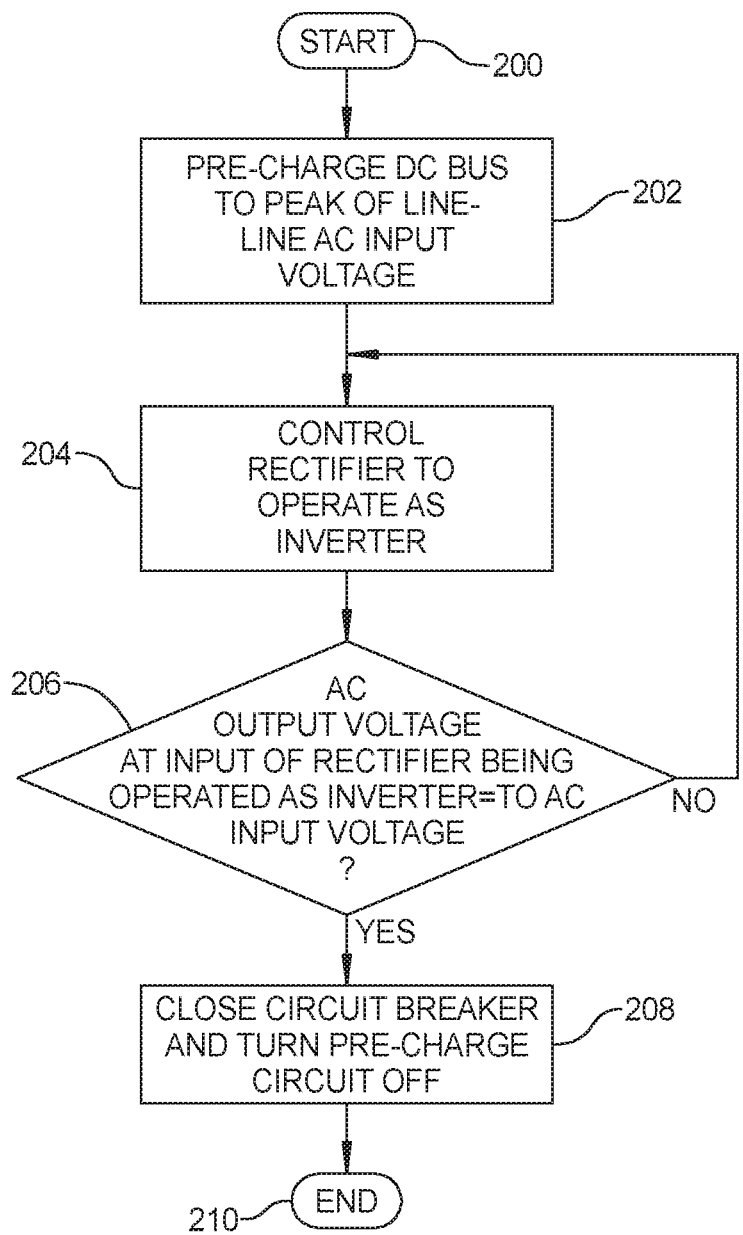
FIG. 2 is a flow chart of a control routine for the control of the UPS system of FIG. 1 to reduce in-rush currents in accordance with an aspect of the present disclosure.

FIG. 2 is a flow chart of an illustrative control routine for the foregoing operation of UPS system described immediately above. This control routine is implemented in controller 122. The control routine starts at 200. At 202, the DC bus 110 is charged by pre-charge circuit 134 so that the DC voltage level on DC bus 110 equals the peak AC voltage level of line-line AC input voltage at input side 103 of circuit breaker 102. Illustratively, controller 122 closes controlled switch 136 that provides AC power from AC power input 101 to rectifier 138 and controls rectifier 138 so that a DC voltage level of DC voltage provided by rectifier 138 at its output 140 equals the peak AC voltage level of the line-line AC input voltage which is monitored by controller 122 via AC voltage sensor 130. At 204, rectifier 106 is operated by controller 122 as an inverter to invert the DC on DC bus 110 at DC output 108 of rectifier 106 to AC that is output by rectifier 106 at AC input 104 of rectifier 106. In operating rectifier 106 as an inverter, controller 122 does so to regulate the AC voltage provided by rectifier 106 at its AC input 104 to be equal to AC voltage at AC power input 101. At 206, the control routine checks whether the AC voltage difference across circuit breaker 102 is zero. It does so by comparing the AC voltage at AC power input 101 measured via AC voltage sensor 130 with the AC voltage at AC input 104 of rectifier 106 measured via AC voltage sensor 132. If the AC voltage at input 104 of rectifier 106 is not equal to the AC voltage at AC power input 101, the control routine branches back to 204. If the AC voltage at input 104 of rectifier 106 is equal to the AC voltage at AC power input 101, the control routine branches to 208 where it closes circuit breaker 102 and also opens controlled switch 136 to turn pre-charge circuit 134 off. The control routine then branches to 210 where it ends.

It should be understood that the logic for the foregoing control of UPS system 100 by controller 122 illustratively can be implemented in hardware logic, software logic, or a combination of hardware and software logic. In this regard, controller 122 can be or can include any of a digital signal processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that controller 122 performs a function or is configured to perform a function, it should be understood that controller 122 is configured to do so with appropriate logic (such as in software, logic devices, or a combination thereof).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of reducing inrush currents in a transformerless rectifier UPS system when an input circuit breaker of the UPS system is transitioned from an open to a closed position, the circuit breaker coupled between an AC power input and an AC input of a main rectifier of the UPS system, a DC output of the main rectifier coupled to a DC bus of the UPS system and an input of an inverter coupled to the DC bus, the method comprising:

before the circuit breaker is transitioned to the closed position from the open position, charging the DC bus to a DC voltage having a DC voltage level that is equal to an AC voltage level of line-line AC voltage of AC input power to the UPS system, operating the main rectifier as an inverter to provide an AC output voltage at the AC input of the main rectifier and regulating this AC output voltage to be equal to an AC voltage at the AC power input; and closing the circuit breaker when the AC voltage at the AC input of the main rectifier is equal to the AC voltage at the AC power input.

2. The method of claim 1 including operating a pre-charge circuit of the UPS system that is coupled between the DC bus and the AC power input to charge the DC bus to the DC voltage level that is equal to the peak AC voltage level of line-line AC voltage of AC input power to the UPS system.

3. The method of claim 2 wherein operating the pre-charge circuit to charge the DC bus includes closing a controlled switch of the pre-charge circuit to couple a rectifier of the pre-charge circuit to the AC power input and controlling the rectifier of the pre-charge circuit to charge the DC bus to the DC voltage level that is equal to the peak AC voltage level of the line-line AC voltage of AC input power.

\* \* \* \* \*